US011501591B2

(12) United States Patent
Hall et al.

(10) Patent No.: US 11,501,591 B2
(45) Date of Patent: Nov. 15, 2022

(54) SYSTEM AND METHOD FOR MONITORING QUEUE CHARACTERISTICS AND INITIATING ADJUSTMENTS

(71) Applicant: Universal City Studios LLC, Universal City, CA (US)

(72) Inventors: Gregory Shellman Hall, Orlando, FL (US); Shelby Nicole Honea, Orlando, FL (US); Zachary Robert Harig, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 60 days.

(21) Appl. No.: 16/821,596

(22) Filed: Mar. 17, 2020

(65) Prior Publication Data

US 2021/0264709 A1     Aug. 26, 2021

Related U.S. Application Data

(60) Provisional application No. 62/979,311, filed on Feb. 20, 2020.

(51) Int. Cl.
*G07C 11/00*     (2006.01)
*G05B 19/042*     (2006.01)
(Continued)

(52) U.S. Cl.
CPC ............ *G07C 11/00* (2013.01); *G05B 19/042* (2013.01); *G05B 2219/25011* (2013.01);
(Continued)

(58) Field of Classification Search
CPC .... G07C 11/00; G05B 19/042; H04N 21/436; H04N 21/44
(Continued)

(56) References Cited

U.S. PATENT DOCUMENTS 7,541,926 B2    6/2009   Dugan et al.
7,787,965 B2    8/2010   Hale et al.
(Continued)

FOREIGN PATENT DOCUMENTS

| CN | 106659940 A | 5/2017 |
| EP | 3001660 A1 | 3/2016 |
| WO | 2016045322 A1 | 3/2016 |

OTHER PUBLICATIONS

Oakes, Steve. "Musical tempo and waiting perceptions." Psychology & Marketing 20.8 (2003): 685-705. (Year: 2003).*
(Continued)

*Primary Examiner* — Mohammad Ali
*Assistant Examiner* — Joshua T Sanders
(74) *Attorney, Agent, or Firm* — Fletcher Yoder, P.C

(57) ABSTRACT

A queue control system controls a queue structure of a queue in an amusement park. The queue control system includes a controller and a queue structure control associated with the queue structure. The controller receives, from an input device that monitors a queue characteristic of the queue, data feedback indicative of the queue characteristic. The queue characteristic is indicative of a queue length, queue wait time, queue rate, or queue throughput. The controller also outputs a control command based on the data feedback. The queue structure control receives the control command and changes at least one aspect of the queue structure based on the control command.

17 Claims, 5 Drawing Sheets

(51) Int. Cl.
*H04N 21/436* (2011.01)
*H04N 21/44* (2011.01)

(52) U.S. Cl.
CPC ...... *G07C 2011/02* (2013.01); *G07C 2011/04* (2013.01); *H04N 21/436* (2013.01); *H04N 21/44* (2013.01)

(58) Field of Classification Search
USPC ........................................................ 700/276
See application file for complete search history.

(56) References Cited

U.S. PATENT DOCUMENTS

| | | | |
|---|---|---|---|
| 7,821,422 | B2 | 10/2010 | Hutchison et al. |
| 8,259,925 | B2 | 9/2012 | Smith et al. |
| 9,390,424 | B2 | 7/2016 | Hendrickson |
| 10,152,840 | B2 | 12/2018 | Geraghty et al. |
| 10,207,193 | B2 | 2/2019 | Stenzler et al. |
| 10,304,276 | B2 | 5/2019 | Schwartz et al. |
| 2003/0078793 | A1 | 4/2003 | Toth |
| 2008/0140231 | A1* | 6/2008 | Blackwell ............ H05B 47/155 700/90 |
| 2011/0273312 | A1* | 11/2011 | Eggleton .............. H05B 47/155 340/944 |
| 2015/0081348 | A1 | 3/2015 | Avera et al. |
| 2015/0088671 | A1 | 3/2015 | Xiong et al. |
| 2017/0011311 | A1* | 1/2017 | Backer .................. G06Q 10/02 |
| 2017/0169449 | A1 | 6/2017 | Heaven et al. |
| 2018/0129984 | A1 | 5/2018 | Polk et al. |
| 2018/0144198 | A1* | 5/2018 | Funagi ..................... G06T 7/70 |
| 2018/0312173 | A1 | 11/2018 | Hall |
| 2019/0024454 | A1* | 1/2019 | Maddamma ........ E05B 65/0007 |
| 2019/0104596 | A1* | 4/2019 | Den Hartog ......... H05B 47/115 |
| 2019/0159003 | A1 | 5/2019 | Padgett et al. |
| 2019/0201806 | A1 | 7/2019 | Weston |

OTHER PUBLICATIONS

PCT/US2021/018286 International Search Report and Written Opinion dated May 27, 2021.

Sarah Pike, "Changing Perception: Simple Ways to Improve Your Customers' Waiting Experience"; Business.Com, Mar. 9, 2016; https://www.business.com/articles/simple-ways-to-improve-your-customers-waiting-experience/ (retrieved Oct. 7, 2019).

Brian Laney, "How to Turn Customer Wait Time Into an Experience", Alerttech, Nov. 3, 2015; http://alerttech.net/customer-wait-time/ (retrieved Oct. 7, 2019).

https://blacktrax.cast-soft.com/tracking_lighting/.

* cited by examiner

SYSTEM AND METHOD FOR MONITORING QUEUE CHARACTERISTICS AND INITIATING ADJUSTMENTS

CROSS-REFERENCE TO RELATED APPLICATION

This application claims the benefit of U.S. Provisional Application No. 62/979,311, entitled "SYSTEM AND METHOD FOR MONITORING QUEUE CHARACTERISTICS AND INITIATING ADJUSTMENTS", filed on Feb. 20, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks (e.g., theme parks) have grown substantially in popularity. Accordingly, there has been an increased demand and an accompanying increase in competition with respect to amusement parks. It is therefore desirable to add more entertaining and interactive attractions to amusement parks. Engaging guests throughout their time at an amusement park is a major priority of amusement park entities. Even though large attractions, like rides and shows, tend to increase traffic at amusement parks, there exists a need to keep guests engaged, fascinated, and intrigued throughout their visit with other attractions that can make their experience all the more memorable. For example, there exists a need to keep guests engaged, fascinated, and intrigued while the guests wait for various attractions in attraction queues. There also exists a need to maintain certain attraction queue features, which may be costly, in an efficient manner. Thus, it is recognized that technology for improved interactions at amusement parks, such as improved queue experience and feature control, is desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a queue control system controls a queue structure of a queue in an amusement park. The queue control system includes a controller and a queue structure control associated with the queue structure. The controller receives, from an input device that monitors a queue characteristic of the queue, data feedback indicative of the queue characteristic. The queue characteristic is indicative of a queue length, queue wait time, queue rate, or queue throughput. The controller also outputs a control command based on the data feedback. The queue structure control receives the control command and changes at least one aspect of the queue structure based on the control command.

In an embodiment, a queue control system controls a plurality of lights associated with a queue in an amusement park. The queue control system includes a sensor, a controller, and at least one control corresponding to the plurality of lights. In particular, the sensor monitors a queue characteristic of the queue. The controller receives, from the sensor, data feedback indicative of the queue characteristic and determines a light control of the plurality of lights based on the data feedback indicative of the queue characteristic. The controller also outputs a control command indicative of the light control. The at least one control receives the control command and executes the light control to change at least one aspect of the plurality of lights based on the control command. The at least one aspect of the plurality of lights may include a light frequency, a light intensity, an activation/deactivation sequence, or a combination thereof.

In an embodiment, one or more non-transitory computer-readable media stores instructions which, when executed by at least one processor, cause the at least one processor to perform operations. The operations performed by the processor include monitoring, via a sensor, a queue characteristic of a queue of an amusement park. The queue characteristic is indicative of a queue length, a queue wait time, a queue rate, or a queue throughput. The processor receives, from the sensor, data feedback indicative of the queue characteristic and determines, based on the data feedback, a light control of a plurality of lights associated with the queue. The processor also outputs a control command indicative of the light control to a plurality of controls corresponding to the plurality of lights.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
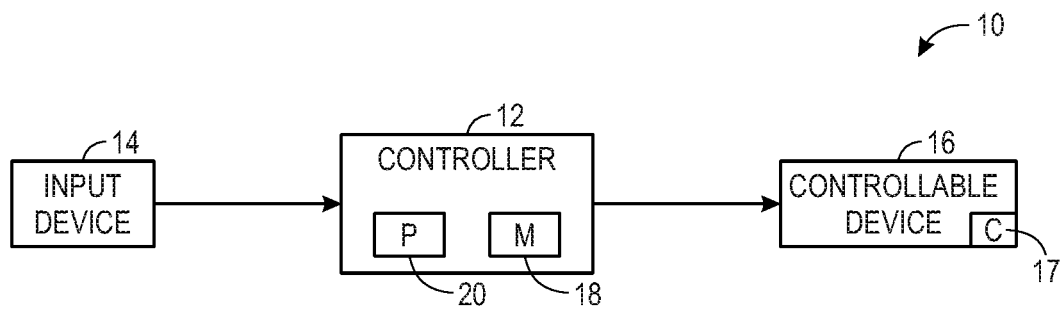
FIG. 1 is a schematic block diagram illustrating a queue control system for controlling queue experiences and features of an attraction queue, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, the term "or" is intended to be inclusive indicating that A or B includes A alone, B alone, or both A and B.

Amusement parks (e.g., theme parks) draw crowds of guests to their attractions. Amusement parks may have attraction queue structures to organize guests who desire to participate in particular attractions. Such queue structures often provide a route to a destination (e.g., an entry to a ride), which may be referred to as the exit of the queue. Indeed, after waiting in the queue, the guests exit the queue to participate in the attraction for which the queue was formed. In the present disclosure, the exit of the queue may also be referred to as the start of the queue. This is because the exit or start of the queue is where guests begin organizing in a line. Likewise, the end of the queue refers to the entry point of the queue, which may be a substantial distance (e.g., in time or space) from the start of the queue depending on how many guests are in the queue.

Queue structures, which may include physical, digital, video, and audio protocols (e.g., housings, walls, gates, doors, speakers, and televisions), may aid in organizing guests in an orderly fashion and engaging guests during their wait. The queue wait time (wait time) for each attraction may vary in duration from attraction to attraction in the amusement park based on, for example, attraction demand and attraction duration (e.g., ride time). Further, queue structures may vary in appearance and/or type from attraction to attraction based on the type of attraction, the location of the attraction, the time of year, etc. For example, a queue structure including a section in which guests are in an outside environment may include misters to cool guests in hot temperatures. Further, a queue structure in a water-themed section of an amusement park may be fully in an outside environment, while a queue structure for a roller coaster attraction may contain both outdoor and indoor segments. Regardless of the type of queue structure, guests who desire to participate in various attractions may have to endure long wait times in the queue structures before experiencing the attraction. Waiting guests may be impatient or relatively disinterested, which may impact a guest experience. Thus, entertaining guests and enhancing the guest experience in the queue structures is desirable.

Present embodiments are directed to a queue control system for a queue structure in an amusement park. The queue control system may include an automation controller (e.g., a programmable logic controller), wherein a processor and memory of the automation controller operate to control communicatively coupled devices by actuating them based on identified queue characteristics detected by sensing features of the queue control system. Specifically, the queue control system may operate one or more controllable devices based on queue characteristics indicated by an input device (e.g., an image sensor) that monitors a queue in the queue structure. In some embodiments, the queue control system determines a modification to an operation of the controllable devices based on a comparison of queue characteristics indicated by the input device to queue characteristics that are mapped (e.g., stored as a table in the memory) in the queue control system. When certain queue characteristics are identified, the queue control system may perform an algorithm (e.g., employ a lookup table) to identify and initiate a desired operation of the controllable devices that corresponds to the queue characteristics. In response to determining that a current status (e.g., operation, state) of a controllable device does not correspond to a desired status of the controllable device in view of a detected queue characteristic, the queue control system may cause the status of the controllable device to change to meet the desired status corresponding to the detected queue characteristics. For example, the controllable devices include light sources that may be modulated in accordance with queue characteristics, such as a queue wait time and a queue flow rate. As a specific example, in response to a queue wait time decreasing past a threshold, the queue control system may increase an operational variable of the light sources (e.g., rate of frequency modulation and/or a rate of intensity modulation) and/or decrease the operational variable in response to the queue wait time increasing past the threshold. Other lighting effects are also contemplated, and will be described in detail with reference to the drawings. In general, the light sources may be modulated based on the queue characteristics indicated by the input device to provide an experience tailored to characteristics of the queue at a given time.

The queue control provided by present embodiments enhances the guest experience and improves computer system operation by making operational changes efficient and accessible to human operators. As an example, the queue control system may improve efficiency of operating the queue by adjusting special aspects or energy consumption based on one or more queue input characteristics. For example, if the queue control system determines that a queue length is short, the queue control system may control certain queue structures to close-off, such as a room, a segment of a room, and corresponding energy-consuming features (e.g., lighting, heating, ventilation, and/or air conditioning [HVAC] features). These and other aspects will be described in detail below with reference to the drawings.

Turning to the drawings, FIG. 1 is a schematic block diagram illustrating an embodiment of a queue control system 10. The illustrated queue control system 10 includes a controller 12, an input device 14, a controllable device 16, and a control 17 (e.g., an actuator). The control 17, which may be integral with the controllable device 16, is representative of a feature or set of features for controlling (e.g., activating, managing) an operation of the controllable device 16. It should be noted that the controller 12, the input device 14, the controllable device 16, and the control 17 are each representative of any number of such features that may operate together in accordance with present embodiments. The controller 12, being communicatively coupled to the input device 14 and the controllable device 16, receives an input (e.g., data feedback) from the input device 14 and sends an output to the controllable device 16. The controller 12 may determine the output based on an algorithm that processes the input. For example, the controller 12 contains computer-readable instructions stored in a memory 18 (e.g., non-transitory, tangible, and computer-readable medium/memory circuitry) and a processor 20 that executes the instructions, which may operate to perform the algorithm. More specifically, the memory 18 may include a volatile memory, such as random access memory (RAM), and/or a nonvolatile memory, such as read-only memory (ROM). The memory 18 may store a variety of information and may be used for various purposes related to determining output commands to the controllable device 16. Further, the memory 18 may store processor executable instructions, such as firmware or software, for the processor 20 to execute. The memory 18 may include ROM, flash memory, a hard drive, or any other suitable optical, magnetic, or solid-state storage medium, or a combination thereof. The memory 18 may store data, instructions, and any other suitable data. For example, the memory 18 may include a mapping of queue characteristics (e.g., queue length) to desired operations or operating values (e.g., turn on, turn off, modulate) of the controllable device 16. The mapping may be utilized in determining a control parameter (e.g., set point or operating value) for a controllable device 16. For example, the controller may determine the control parameter by cross-referencing values of the data feedback with preferred control parameters. In operation, the processor 20 executes instructions on the memory 18 to generate and/or provide control commands to the controllable device 16. The processor 20 is any suitable processor that can execute instructions for carrying out the presently disclosed techniques, such as a general-purpose processor, system-on-chip (SoC) device, an application-specific integrated circuit (ASIC), or some other similar processor configuration.

The input device 14 may be one or more sensors (e.g., image sensors, cameras) that are disposed in various locations in or near a queue or queue structure to monitor queue characteristics, which may include a queue length, a queue flow rate (e.g., throughput), a queue wait time, and a queue location, among others. A queue, as disclosed herein, may correspond to a line or sequence of groups and/or individuals that are in a queue structure. A queue structure, as disclosed herein, may correspond to the physical, digital, video and audio protocols that are configured to regulate or be utilized in a queue. For instance, a queue structure may include one or more gates, walls, or metal bars that may be used to direct individuals or groups in the queue. The queue structure may also include projectors, speakers, displays, and the like for providing guidance and entertainment. The queue length may correspond to an amount of persons in the queue or a distance. The queue wait time may correspond to an amount of time it takes for a person (or a group) to enter a queue and exit the queue, whereby exiting the queue occurs at the start of the queue (i.e. the queue generally operates according to a first-in-first-out rule). Thus, a queue wait time for a person occupying a position in a queue may generally correlate to the occupied position. That is, a person occupying a position further from the start of the queue may have a longer queue wait time than a person occupying a position closer to the start of the queue. The queue flow rate (e.g., throughput, queue rate) may correspond to an amount of distance traversed by the individuals and/or groups in the queue divided by the amount of time spent in traversing the amount of distance. Additionally or alternatively, the queue flow rate may refer to a number of individuals and/or groups that enter or exit the queue over a period of time. Indeed, the queue flow rate may correspond to an amount of individuals exiting and/or entering the queue in a given time period, divided by the time period. In some embodiments, a queue flow rate may correspond to an amount of people that crosses any point of the queue structure in a certain amount of time, divided by the certain amount of time. Further, in some embodiments, a queue wait time may correspond to a wait time associated with a specific position in the queue. That is, a queue wait time for a specific person or group in a queue may correspond to a predicted time based on a number of persons ahead of the specific person or group in the queue divided by the queue flow rate.

The queue location may correspond to a location of the queue structure (e.g., inside, outside, near water). In some embodiments, the queue location may correspond to a section of the queue structure that is occupied by a queue. Indeed, the queue location may correspond to a location of any position within a queue structure that is occupied by the queue. Further, the queue location may correspond to a specific location where the queue generally ends. The input device 14 generally monitors queue characteristics, such as those described above, and provides feedback to the controller 12. Further, in some embodiments, the input device 14 may include an operator interface that manually receives an input from an operator via a graphical user interface coupled to the operator interface, where the manual input corresponds to any of the above-described queue characteristics. It should be noted that queue characteristics may be distinguished from other detectable conditions based on correlations to other queue characteristics. Indeed, queue characteristics may specifically exclude measures that are not indicative of a queue. For example, a queue length may be distinguished from a single individual or group standing in a particular location by detecting and confirming correlations with other measured features. Specifically, for example, when a large gap exists between a single individual and a group of individuals detected as standing in close proximity along a queue path, the queue length will not be determined by the single individual based on identification of the individual as an outlier. As another example, movement (or lack of movement) through the queue may also be used to detect such outliers.

Based at least in part on the queue characteristics received from the input device 14, the controller 12 communicates a control command (e.g., the output, queue control command) to the controllable device 16. Specifically, the controller 12 may communicate the control command to the control 17 (e.g., queue structure control) coupled to the controllable device 16 and cause the control 17 to perform instructions corresponding to the control command. The control command may correspond to instructions that, when executed, cause one or more functions or aspects of the controllable device 16 to be enabled, activated, deactivated, disenabled, modulated, actuated, etc. The controllable device 16 may include a device that is configured to entertain guests in a queue, inform guests in the queue, provide a structure to the queue structure, and/or control environmental conditions in the queue structure. Indeed, modifying a state or status of the controllable device 16 based on the input received from the input device 14 may cause a modification to one or more physical, digital, video, and/or audio aspects of a queue environment (e.g., queue structure). As will be discussed later, in some embodiments, the controller 12 may receive inputs from multiple and/or different types of input devices 14 and further may output the control command to multiple controllable devices 16 simultaneously or in a sequence.

Figure 2:
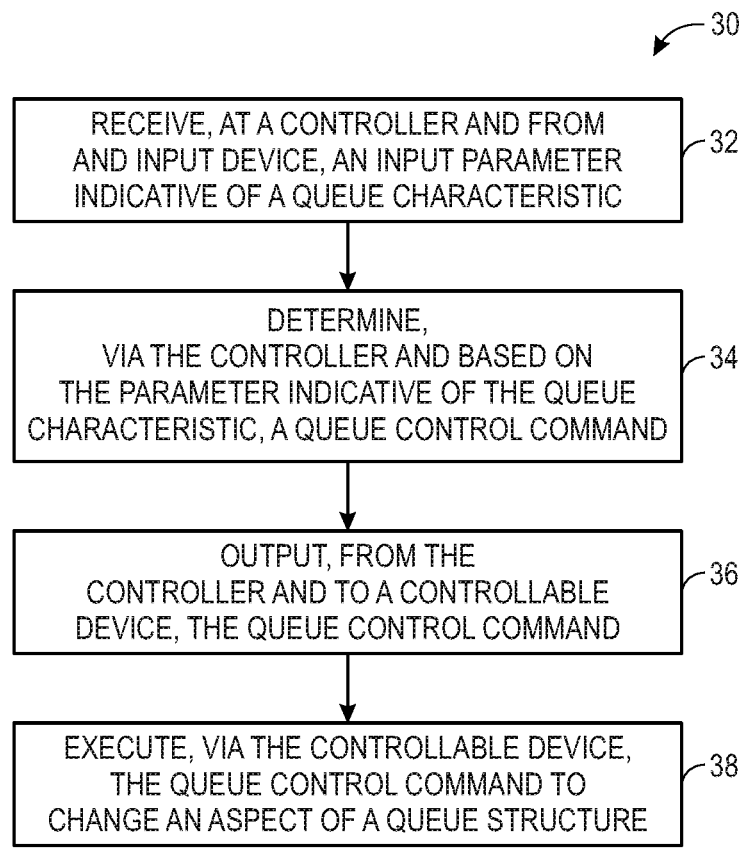
FIG. 2 is a flow chart illustrating a method for controlling experiences and features of the attraction queue, via the queue control system of FIG. 1, in accordance with an embodiment of the present disclosure.

FIG. 2 is a flow chart illustrating an embodiment of a method 30 for executing an output comprising a queue control command to change an aspect of a queue structure. The method 30 may be implemented by one or more components of the queue control system 10 of FIG. 1. The method 30 includes receiving (block 32), at a controller and from an input device, an input parameter indicative of a queue characteristic. The input device may be communicatively coupled to the controller. As previously described, the input device may include a camera, a sensor, or the like. Further, queue characteristics may include a queue length, a queue flow rate, a queue wait time, and a queue location. Based on the input parameter, the controller may determine (block 34) a queue control command. For example, the controller may enter the input indicative of the queue characteristic to an algorithm that determines the queue control command based at least in part on the input indicative of the queue characteristic. The queue control command, when executed, may change an aspect of the queue environment by changing (e.g., altering, modifying, activating, deactivating, updating) an aspect of a controllable device that is within the queue environment or that is configured to regulate one or more aspects of the queue environment or devices within the queue environment, as described in detail below.

The method 30 also includes outputting (block 36) the queue control command from the controller to the controllable device. The queue control command may include computer-readable instructions that may cause one or more aspects of the controllable device to be changed, which may also cause one or more aspects of the queue structure to be changed. The queue control command may also include a control signal (e.g., a digital signal, a 4 to 20 milliamp signal) that causes a response in the controllable device to effect discrete and/or analog control. As previously described, the controllable device may entertain guests in a queue, inform guests in the queue, provide a boundary to the queue structure, and/or control environmental conditions in the queue structure. For example, the controllable device may be one or more light sources that activate and modulate to entertain or intuitively inform guests in a queue. Further, the controllable device may be a video-enabled device (e.g., a television) having an instructional video, a speaker configured to output audio, or an automatic door or a gate that helps provide a physical boundary to the queue. Further, the controllable device may also be a device that controls other environmental features of the queue, such as a heating, ventilation, and/or air conditioning (HVAC) device, a mister, a sprinkler, or the like. Regardless of the type of controllable device, the controllable device may perform specific operations based on the queue control command it receives from the controller.

The method also includes executing (block 38), via the controllable device, the queue control command to change an aspect of the queue structure. The aspect of the queue structure that is changed may correspond to any physical, digital, or virtual change in the queue structure. For example, the queue control command may cause a speaker to stop playing music in a section of a queue structure that is unoccupied. As another example, the queue control command may cause a heater in a section of a queue that is occupied to activate to provide warmth to guests in the occupied section of the queue. In some embodiments, the method 30 may also include operating one or more controllable devices and changing an aspect of a queue structure in response to a deviation in an input parameter from previously received input parameters. Indeed, in these embodiments, the controller may store previously received input parameters in a memory (e.g., the memory 18) or database and then may change an aspect of the queue in response to the input parameter deviating from previously received input parameters (or an average of previously received input parameters, or some other benchmark parameter). For example, in response to a queue length increasing, an overflow queue structure may be activated or opened to allow for guests to wait in a location preferable to a queue operator. Thus, present embodiments may improve operation of the controller 12 by increasing operation efficiency and providing improved control/accessibility for human operators.

Figure 3:
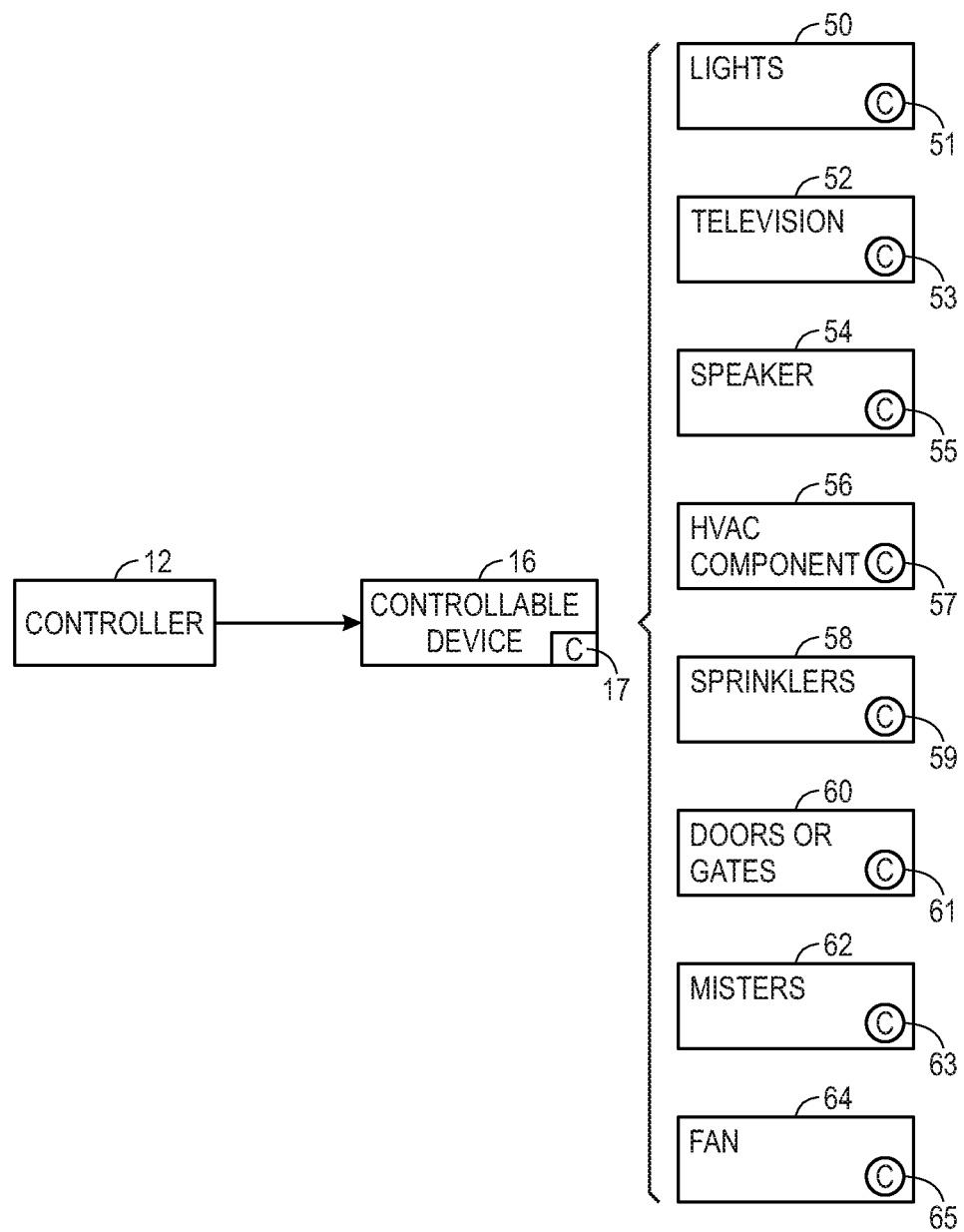
FIG. 3 is a schematic block diagram illustrating types of controllable devices that may be controlled by the queue control system of FIG. 1, in accordance with an embodiment of the present disclosure.

FIG. 3 is a schematic block diagram of types of the controllable devices 16 that may be communicatively coupled to and controlled by the controller 12. In particular, the controllable devices 16 may include lights 50 (or a lighting system) having a control 51, a television 52 (or any form of video display such as a projector) having a control 53, a speaker 54 having a control 55, a heating, ventilation, and/or air conditioning (HVAC) component 56 having a control 57, a sprinkler 58 having a control 59, a door or gate 60 (e.g., a translatable gate, rope, chain) having a control 61, a mister 62 having a control 63, a fan 64 having a control 65, or the like. Provided below are examples of how each of these types of controllable devices 16 may be controlled by the controller 12 based on the input indicative of a queue characteristic, which is received from the input device 14.

The controller 12 may activate, deactivate, modulate, or otherwise control the lights 50 (e.g., light sources, a plurality of lights), via the one or more controls 51, based on the input parameter indicative of a queue characteristic (e.g., a predictive indicator) received by the controller 12 (e.g., via an algorithm that receives and processes the input and determines an output, or control command). Specifically, the controller 12 may determine a light control and output, to the one or more controls 51, a control command indicative of the light control. More specifically, the control command may include an instructed value for at least one aspect of the lights 50. For example, the lights 50 may be configured to light up a section of a queue structure or to entertain guests in a queue. In this case, the lights 50 may be designed to light up a specific portion of a queue structure. The lights 50 may be given a control command (e.g., an instructed value) to emit light or deactivate based on, for example, a prediction of eventual presence of guests in the specific portion of the queue structure based on queue characteristics (e.g., slow throughput coupled with increasing queue length). Further, the lights 50 may be given a command to deactivate based on an indication of a lack of guests occupying the specific portion of the queue. In other words, the controller 12 may determine, as part of the light control, a light-specific activation moment in time and deactivation moment in time for each light of the lights 50 based on the input parameter indicative of the queue characteristic.

Furthermore, in the case of entertaining guests, the controller 12 may activate the lights 50 in accordance with a light show (e.g., a presentation of lights that activate, deactivate, and/or modulate in accordance with a desired pattern). In one embodiment, a series of lights may be arranged in a line or other arrangement and may be configured to successively pulse down the line or other arrangement at a rate determined by the controller 12 based on the input indicative of the queue characteristic. In other words, a first light in the line may be activated and then deactivated as a second light in the line is activated. The second light in the line may be deactivated as a third light in the line is activated, and so on and so forth. In one embodiment, the successive pulsing of the lights may correspond to a successive pulsing of adjacent lights in the series of lights. In another embodiment, the pulsing of light may occur in a pattern different from a mere successive or adjacent pulsing. A rate by which the lights are successively activated and deactivated may be determined by the controller 12 based on a queue characteristic (e.g., input parameter) such as a queue rate or queue length. For example, when the queue is short, the rate may be increased, and when the queue is long, the rate may be decreased. Thus, the controller 12 may output instructed values corresponding to an activation instruction, a deactivation instruction, and a time period between activation corresponding to the activation instruction and deactivation corresponding to the deactivation instruction for each light of the lights 50. In addition, in some embodiments, the instructed values may include a first activation instruction corresponding to an activation of a first light at a first moment in time and a first deactivation instruction corresponding to deactivation of the first light at a second moment in time following the first moment in time. Further, the instructed values may include a second activation instruction corresponding to activation of a second light at a third moment in time and a second deactivation instruction corresponding to deactivation of the second light at a fourth moment in time after the third moment in time.

Present embodiments may operate to avoid displaying the same effects to a patron while the patron is waiting in a particular queue. For example, the patterns displayed on the light show described above (or other effects) may be changed based on a queue length, such that the guests in the queue do not experience the same light show (or other effect) more than once. For example, the controller 12 may modulate a speed of procession (e.g., 0.5×, 1×, 3× normal speed) of a particular light show at a frequency that corresponds to a guest in the queue structure having an ample amount of time to see the complete light show at least once. That is, the controller 12 may control an amount of time it takes for the particular light show to complete based on a queue wait time corresponding to the guest. The light show or other effect may be extended beyond a timeframe in which the entire queue could be traversed to achieve this result. In some embodiments, instead of modulating a speed of procession of the particular light show, the controller 12 may append or remove aspects of a light show to control (e.g., limit) exposure of a guest to the same light show while resident in the queue. This may be done without regard to the speed of procession of a particular light show. In one embodiment, a certain pattern may be modified with different colors presented by the lights 50 instead of (or along with) a change of the speed of procession of the light show. Likewise, an instructional video may be extended or shortened based on queue length to limit exposure to guests based on a time frame in which the entire queue could be traversed. In such embodiments, the timeframe may be estimated/calculated based on data from the input device 14, for example.

It should be noted that in some embodiments, the activation instruction, the deactivation instruction, and the time period between the activation corresponding to the activation instruction and the deactivation corresponding to the deactivation instruction may be unique for each light of the lights 50 (or of a set of lights within the lights 50). The controller 12 may also control an intensity (i.e. brightness) of the lights 50 (e.g., light emitting diodes [LEDs], incandescent, fluorescent) and a type of light (e.g., wavelength and frequency of light) that is emitted from the lights 50 by outputting one or more instructed values indicative thereof.

The controller 12 may also output instructed values corresponding to a length of time and/or a frequency of replaying a light show on the lights 50 based on the input parameter received.

Groups of lighting features may be driven (controlled) in a manner that provides an effect (e.g., a wave-like effect) that intuitively suggests characteristics of the queue. For example, a wave-like lighting effect may indicate a direction of travel through a queue structure that implicitly beckons guests to the start of the queue. When the queue length is shorter than a threshold value, the beckoning may be increased with more rapid changes to suggest a rapid pace through the queue. Likewise, the beckoning may be slowed with slower changes to the lighting when the queue length is greater than a threshold value, indicating a slower pace through the queue. Similarly, detected characteristics of the queue, such as queue length, may be used to brighten or dim the lights to intuitively signal the queue characteristics to guests. As a specific example, in one embodiment, the lights 50 may be positioned along a path of a queue structure. The queue structure may include a tunnel in which guests remain for at least a portion of a queue wait time. In this tunnel, there may be an arrangement of the lights 50 disposed about one or more portions of walls that create the tunnel. In some embodiments, the lights 50 may be arranged in a line through the tunnel. These lights 50 may be controlled to activate and/or modulate based on, for example, an input indicative of a queue wait time. Indeed, the queue wait time may be used in determining a rate of activation of the lights 50 in the arrangement (e.g., how fast a light activates and deactivates relative to another light in the arrangement of the lights 50). For example, in response to determining that a queue wait time has increased in wait time the rate of activation of the lights 50 may slow down. Further, in response to determining that a queue wait time has decreased, the rate of activation of the lights 50 may increase.

Additionally or alternatively, the controller 12 may control settings of the television 52 based on the input parameter indicative of the queue characteristic. These settings may include a volume level, a brightness level, a contrast, and/or an on/off state, to name a few. The settings may also include a determination of a video that is to be displayed on the television 52. Indeed, in this case, the controller 12 may have a selection of videos that are played based on, for example, a queue wait time. That is, the controller 12 may have specific videos that are to be played on the television 52 based on a correlation between the specific videos and values of a queue characteristic and/or values of a plurality of queue characteristics that in combination may indicate an optimal video. In other words, the controller 12 may cause the television to display a video with video characteristics based on the queue wait time. For instance, in response to a relatively shorter queue wait time, the controller 12 may cause, via the control 53, the television 52 to play a video that is shorter in length than another video, which may be mapped to play when the queue wait time is longer. In some embodiments, the controller 12 may determine a frequency (e.g., every 2 minutes, 5 minutes, 10 minutes) by which a particular video segment (e.g., a safety segment) is played. The controller 12 may also determine a video to play that corresponds to a certain queue flow rate or a range of queue flow rates. In this manner, guests will not experience the same video content, except for perhaps the particular video segment (e.g., safety segment) more than once while waiting in the queue. This feature may also be applied in other venues where canned videos are displayed, such as in restaurants, food courts, transportation stations, etc.

Furthermore, the controller 12 may control a speaker 54 by modulating a volume level, determining a pace or genre of music, or other sound settings. For example, the controller 12 may cause fast-paced music to be played on the speaker 54 when the queue flow rate exceeds a certain threshold queue flow rate.

Further, the controller 12 may activate or deactivate, via the control 57, the HVAC component 56 based on an input parameter received by the controller 12. For example, the controller 12 may set a desired temperature for an environment that is heated or cooled by the HVAC component 56. Indeed, the controller 12 may cause the HVAC component 56, via the control 57, to operate to cool or warm the air in or near a queue structure based on the input parameter. For example, the controller 12 may cause a heater or an air conditioning unit to activate in response to predicting that a queue length is likely to exceed a certain threshold within a timeframe based on feedback from sensors (e.g., cameras, image sensors). In some embodiments, if a portion of the queue is closed based on the input parameter, the HVAC component 56 or operation thereof may be turned off entirely. Further, the sprinklers 58 may be controlled by the controller 12 (e.g., via the control 59). For example, the sprinkler 58 may be activated to water a portion of a queue structure having forestry, trees, or the like. In response to the controller receiving an indication from the input device 14 that queue length is predicted to extend or extends into an area near the sprinkler 58, the controller 12 may cause the sprinkler to turn off or to decrease a rate of water output.

In an embodiment, the doors or gates 60 may be controlled by the controller 12 (e.g., via the controls 61). The controller 12 may cause one or more of the doors or gates 60 to be opened or closed in response to receiving an input parameter indicative of a queue characteristic such as a queue length. As should be understood, this can also include a combination of queue characteristics, such a queue length and throughput. For example, as will discussed in detail later, in response to receiving an input parameter indicative of a queue length exceeding a desired capacity (or threshold value) for a queue structure, a door (e.g., gate, portal) to an extended queue structure may be opened to accommodate for the increase in queue length. This may include predicting a change in queue location based on a current queue length and current throughput. In contrast, in response to a queue length decreasing beyond the optimal capacity or the threshold value, one or more of the doors or gates 60 may be closed.

Moreover, the misters 62 and/or the fans 64 may be activated or deactivated via the control 63 and the control 65, respectively, by the controller 12 and based on the input parameter. Indeed, for example, the misters 62 and the fans 64 may be activated or deactivated based on an input parameter indicative of a queue length and/or throughput suggesting that the queue will extend into an outside portion of the queue structure. In some embodiments, the misters 62 and the fans 64 are configured to regulate a temperature of a section that has the HVAC component 56. It should be noted that the misters 62, the fans 64, or both may be considered HVAC components 56 in certain embodiments. Other controllable devices 16 may also be controlled by a control to execute queue control commands received from the controller 12 in response to an input parameter indicative of a queue characteristic. It should be noted that any single control (e.g., actuator) may control multiple controllable devices in some embodiments. As previously described, many controllable devices 16 (even of different types) can be coupled to the controller 12 directly or indirectly via a wired or wireless medium.

Figure 4:
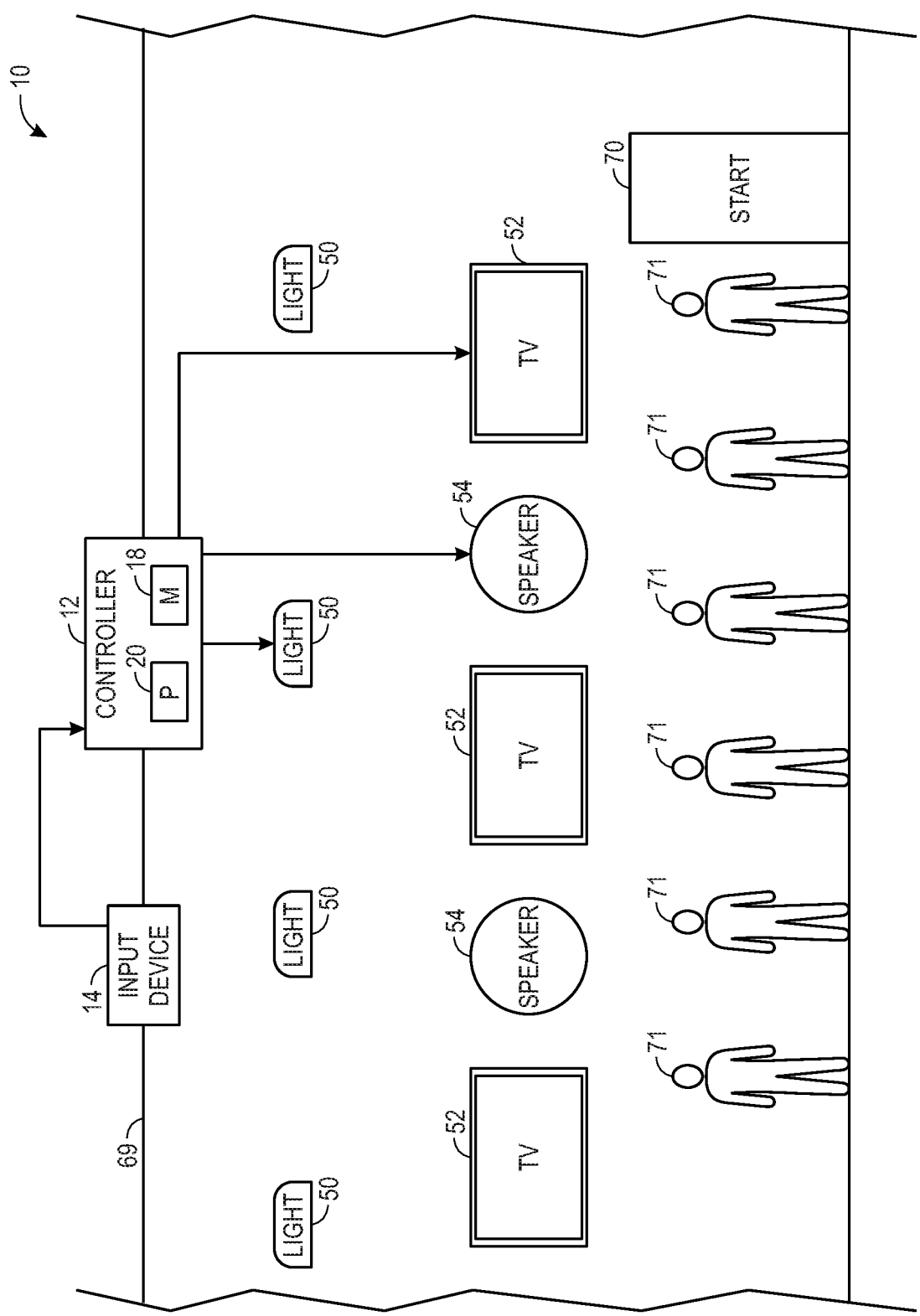
FIG. 4 is a schematic side view of a room having the queue control system of FIG. 1 integrated into a lighting system and/or an audio/visual system, in accordance with an embodiment of the present disclosure.

FIG. 4 is a schematic side view of a queue structure 69 (e.g., a room) having the queue control system 10 with an integrated lighting system and an audio/visual system. The illustrative integrated lighting system includes the lights 50 and the audio/visual system includes the televisions 52 and the speaker 54. Other components (not shown) of the integrated lighting system and the audio/visual system may be included in embodiments of the integrated light system and the audio/visual system. Specifically, the queue structure 69 includes the lights 50, the televisions 52, and the speakers 54. These controllable devices 16 may receive a queue control command from the controller 12 based at least in part on the input comprising one or more queue characteristics from the input device 14. The controller 12 may receive the input via manual input or via an automation, such as by data feedback from a sensor or the like. Indeed, as mentioned previously, the input device 14 may include sensors (e.g., infrared sensors, image sensors, cameras) disposed at various locations of the queue structure that monitor the queue that begins at the start 70 (e.g., a ride entrance) and provide data feedback (e.g., a queue length, a queue flow rate, a queue wait time) to the controller 12. The input device 14 may transmit the data feedback to the controller 12 on a periodic basis such as every millisecond, second, or minute. Based on the data feedback, the controller 12 may issue queue control commands to the controllable devices 16 in the queue structure 69, which may change one or more operating aspects of the controllable devices 16 in the queue structure 69. For example, the lights 50 may be controlled to modulate at a rate that corresponds to a queue flow rate received from the input device 14.

In particular, the lights 50 may be modulated based on a queue wait time and/or other queue characteristics to enhance the experience of the guests in a queue. In one embodiment, the lights 50 may be selectively operated to activate and deactivate in a row. That is, the first light 50 in the row may be activated and then deactivated just as the second light 50 in the row is activated, and so on and so forth. A rate of activation and deactivation may be determined by the controller 12 based on the input parameter. For example, having a fast sequence of light variations (or modulations) on the lights 50 may be overwhelming for guests in the queue when the queue length and queue wait time is long and/or the queue flow rate is slow. Indeed, the enhancement of the guests' experience and/or enjoyability of the light show may be decreased as the guests observe the quickness of the modulation of the lights 50 over and over before they have arrived at the start 70. To address this issue, the controller 12 may receive queue characteristics from the input device 14 and cause the lights 50 to modulate a frequency and/or an intensity of the lights 50 at particular rate that is desired for the guests in the queue structure 69 based on the queue characteristics of the queue. Specifically, a rate of frequency modulation may correspond to a rate of change of a frequency of emitted light (i.e. changing the wavelength of the emitted light from the lights 50). Or, in other words, the rate of frequency modulation may correspond to rate of change of colors of the lights 50. A rate of intensity modulation may correspond to a rate of change of an intensity (i.e. brightness) of the light emitted from the lights 50. Or, in other words, the rate of intensity modulation may correspond to a rate of change of a brightness of the lights 50. For instance, the controller 12 may contain desired rates of frequency modulation and intensity modulation values that correspond to one or more queue characteristics. The controller 12 may cause the rate of frequency modulation of the lights 50 to decrease based on an indication from the input device 14 that a queue wait time exceeds a certain threshold value. Similarly, when it is indicated to the controller 12 that the queue wait time falls short of the threshold value, the controller may increase the rate of frequency modulation to a value that corresponds to the queue wait time. The controller 12 may also cause the lights 50 to activate and deactivate at a rate that is optimal for the guests. In this way, the controller 12 may adjust the lights 50 such that guests do not experience a light pattern/sequence more than once while in the queue structure 69, for example.

Further, based on detected queue characteristics, the controller 12 may activate, via the control 53, one or more of the televisions 52 to play an instructional video in response to a queue length extending or predictively extending into a general location of one or more of the televisions 52. The controller 12 may also select a video corresponding to one of a plurality of videos that each corresponds to a different queue wait time. In this way, the video playing on the television 52 may instruct or entertain guests in a time frame that corresponds to the queue wait time. In another embodiment, the controller 12 may determine a frequency by which a single video is played. For example, the controller 12 may determine, based on an input parameter, to play a particular video (e.g., the safety video) every 2 minutes, 5 minutes, 10 minutes, or some other time interval. Indeed, when the queue is relatively short, the controller 12 may command the televisions 52 to play the video more often than when the queue is relatively long. In doing so, the controller 12 increases the likelihood that a guest in the queue will see an entirety of the video prior to attending the attraction when the queue is relatively short, and increase a likelihood that a guest in the queue does not view the video an unnecessary number of times when the queue is long. Thus, the controller 12 may ensure that guests do not view the same video content, other than the particular video, more than once while in the queue. This may also be accomplished by causing a different video to be displayed at different locations of the televisions 52 in the queue structure 69 based on a queue wait time and/or queue length.

In some embodiments, the controller 12 may operate to incorporate multiple presentations of the same effects or information when a queue wait time is longer than a threshold timeframe. This may be done to refresh the memory of a patron waiting in the queue before proceeding out of the queue. For example, an instructional video may be presented at two different points (in time and location) based on a queue length. As noted above, the particular video may be viewed more than once to refresh a memory of the guests and to provide relevant information at least twice. For instance, a safety video may be played in a first moment in time for a guest in the queue structure 69. If a queue wait time for the guest exceeds a threshold amount of time before exiting from the queue, the safety video may be played again in order to remind the guest of the safety protocols on the video. A location of the guest may be taken into account by the controller 12 and one or more displays may be selected based on the location to provide access to the information being presented.

Further, the televisions 52, the lights 50, and the speakers 54 may all be activated in response to the queue length exceeding or falling short of a certain threshold length. The queue length of FIG. 4 is schematically presented with stick figure people 71 each representing ten guests. Thus, FIG. 4 schematically represents a queue length of sixty guests. In this case, most or all of the televisions 52, the lights 50, and the speakers 54 may be activated due to the queue length extending into sections of the queue structure having the controllable devices 16. If the queue length was only twenty guests long, for instance, then the controller 12 may determine that one or more of the televisions 52 or the speakers 54, and/or the lights 50 that are far away from the start 70 should be turned off and provide corresponding instructions. This programming of the controller 12 would provide efficiencies by avoiding energy expenditure on features positioned or oriented to display and voice, respectively, into a region or section that is different from the section of the queue structure near the start 70 or near the end of the queue.

Figure 5:
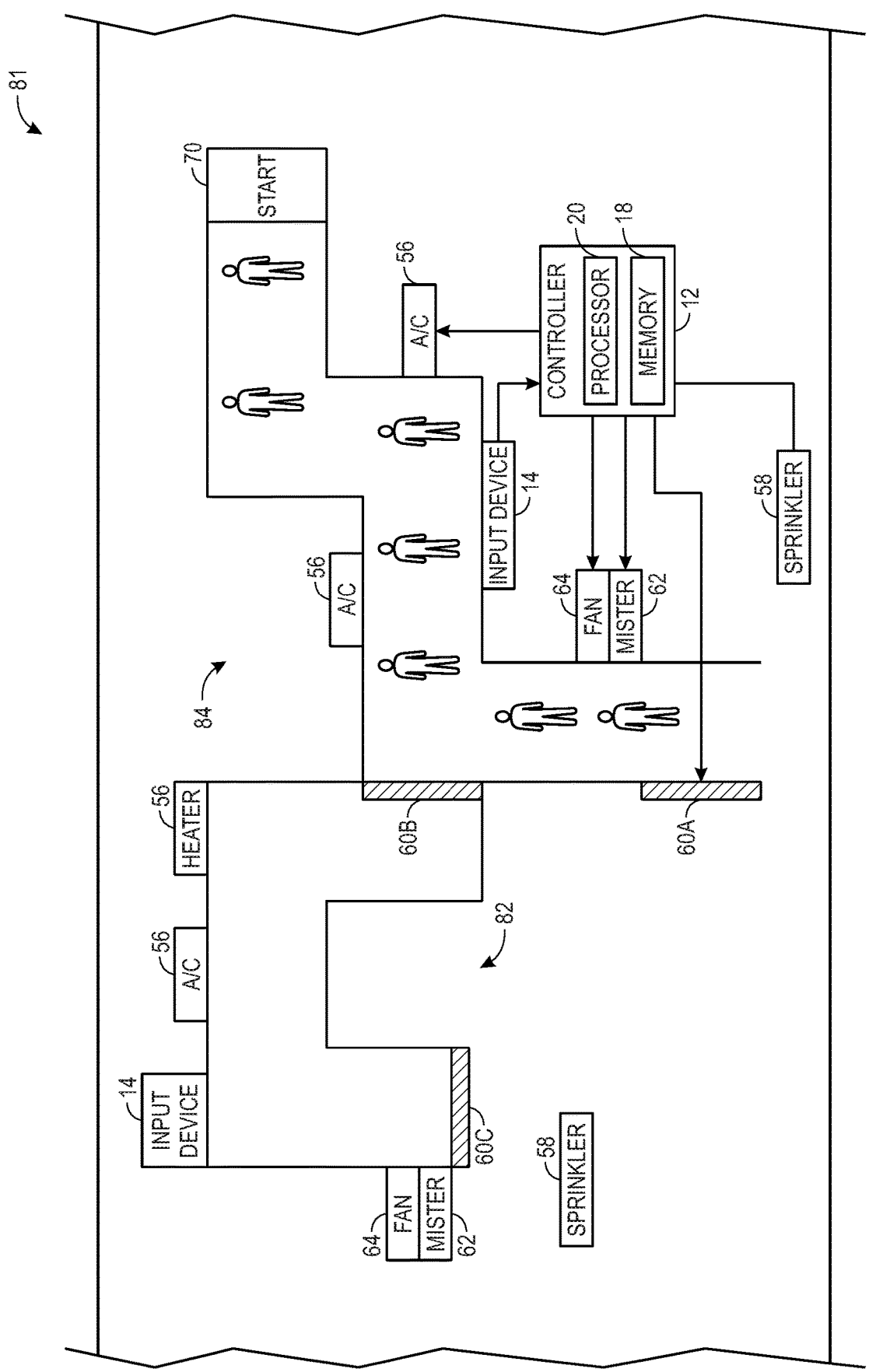
FIG. 5 is a schematic overhead view of a room having the queue control system of FIG. 1 integrated into facility features of an attraction queue, in accordance with an embodiment of the present disclosure.

FIG. 5 is a schematic overhead view of a room 81 having the queue control system 10 integrated into components of a facility system. The room 81 has a section 82 and a section 84. In particular, the controller 12 receives one or more inputs from the input devices 14 and sends an output to the HVAC components 56, the sprinklers 58, the misters 62, the doors or gates 60, and/or the fans 64 based on the queue characteristics identified from the inputs. The queue, as illustrated in FIG. 5, starts at start 70 and ends near the door 60A. Based on the queue length and/or other queue characteristics, the controller 12 may cause the doors 60A, 60B, 60C to be opened or closed. This may include predictive operations that indicate the queue length will increase to a certain length within a particular timeframe based on changes in the queue length and throughput during an overlapping timeframe.

In FIG. 5, the misters 62 and the fans 64 are located near the doors 60A and 60C, which are in between an outside environment and an inside environment, while the HVAC components 56 are located in an inside environment. In some embodiments, one or more HVAC components 56 may be located outside. Further, arrows emerging from the controller 12 to the input device 14 and the controllable devices 16 are representative of the relationship between all the input devices 14 and the controllable devices 16 in FIG. 5 (i.e. not just the particular input device 14 and the particular controllable devices 16 that have arrows attached to the controller 12). As shown in FIG. 5, the door 60B and the door 60C are closed while the door 60A is opened. The door 60B and the door 60C may be closed because the controller 12, having received one or more queue characteristics (e.g., a queue length, a queue flow rate) from the input device 14, determined that the current queue length does not exceed a threshold queue length to open the door 60B and/or the door 60C, and thus caused the doors 60B, 60C to remain in a closed position. Similarly, in a section 82 of the queue structure, the HVAC components 56, the fans 64, and the misters 62 may be deactivated or inactive because the queue length has not exceeded the threshold queue length. In this way, power consumption may be conserved. In some embodiments, however, the sprinkler 58 in the section 82, may be activated due to the controller 12 receiving an input from the input device 14 in the section 82 indicating the closure of the section 82 to guests. In some embodiments, the lack of guests in the section 82 may comprise the indication of the closure of the section 82. In this way, guests may not be disturbed by sprinkling water directed to water forestry, trees, plants, and the like near the queue structure. In response to the queue length being above a certain threshold, the controller 12 may send a command to open to the door 60B and/or the door 60C such that more persons may wait inside of the queue structure rather than outside of the boundaries (e.g., physical housing, line of sight) of the queue structure (e.g., the room 81) or controllable devices 16 of the queue structure.

Instead of generally activating one or more controllable devices 16 without taking queue characteristics into consideration, the controllable devices 16 are controlled based on data feedback from the input devices 14, which monitor current queue characteristics. Many of the controllable devices 16 in the section 84 of the queue structure are active and enabled because the queue length extends to the door 60A. In particular the HVAC components 56, the fans 64, and the misters 62, may be active and enabled (or deactivated) in order to maintain a desired temperature. Since, the section 84 is open to guests, the sprinkler 58 in the section 84, which is near the door 60A, may be deactivated or turned off in order to not disturb (e.g., accidently spray with water or other liquids) guests who are in or entering the queue. Further, in response to one or more queue characteristics being below a threshold value for each of the one or more received queue characteristics, one or more of the controllable devices 16 of FIG. 5 may be commanded by the controller 12 to modify an operation. For example, the section 82 may correspond to an overflow queue structure, which is to be opened only when a queue length of the section 84 exceeds a threshold value. In response to the queue length receding from the threshold value such that the queue length of the queue in section 84 is less than a queue capacity for the section 84, the section 82 may be closed or deactivated. Accordingly, the misters 62 and the fans 64 of the section 82 may be powered down. The doors/gates 60B, 60C may become closed, and the HVAC components 56 in the section 82 may also be powered down or returned to default inactive settings. The sprinkler 58 in the section 82, however, may become activated for at least a portion of a time for watering forestry, plants, and the like near the queue structure due to an indication of the closure of the section 82 to guests.

Figure 6:
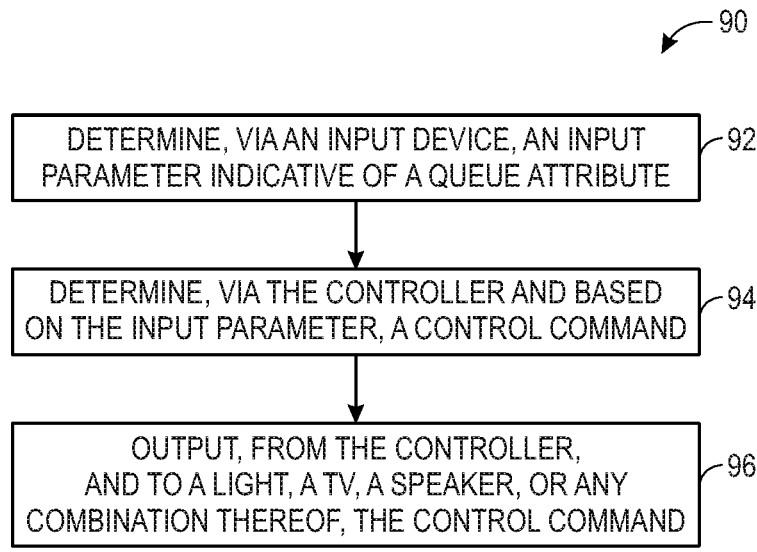
FIG. 6 is a flow chart illustrating a method for controlling a lighting system and/or audio/visual system of an attraction queue via the queue control system of FIG. 1, in accordance with an embodiment of the present disclosure.

FIG. 6 is a flow chart of a method 90 for activating a lighting system and an audio/visual system of a queue structure based on an input received from an input device that monitors the queue characteristics. The method 90 of FIG. 6 generally corresponds to controlling the lighting system and the audio/visual system of FIG. 4. In particular, the method 90 is an embodiment of controlling one or more of the controllable devices 16 of FIG. 4. The method 90 may at least in part be carried out by one or more components of the queue control system 10. The method 90 includes determining (block 92), via an input device, an input parameter indicative of a queue attribute (e.g., a queue characteristic). As discussed earlier, a queue attribute or characteristic may be a queue length, a queue wait time, a queue flow rate, or a combination thereof (including a predictive value based on multiple characteristics). The input parameter may be received manually by an operator entering the input parameter into a controller and/or automatically such as by feedback from sensors.

The method 90 also includes determining (block 94), via a controller and based on the input parameter, a control command. The controller may determine the control command based on, for example, comparing the received input parameter to stored data (e.g., a table) of queue characteristic values that correspond to desired operating values of a device controlled by the controller. If the controller determines that the received input parameter value corresponds to the current operation of the controllable device, then the controllable device may continue operating according to its current operations. However, in response to comparing the received input parameter indicative of a queue characteristic to stored data of a mapping of queue characteristics to desired operating parameters of the device, and determining that the current operation of the device does not correspond to a desired operation of the device, at block 96, the controller may output a control command to a light, a television (TV), a speaker, or any combination thereof. The control command may cause the operating values of the light, the television, the speaker, or any combination thereof to match the stored desired operating values. Thus, in response to determining the control command at block 94, the controller may output (block 96) the control command to the light, the television, the speaker, or any combination thereof. For example, the control command may automatically modify a rate of frequency modulation and intensity modulation of the light based on the input parameter indicative of the queue characteristic. In other words, the controller may determine a rate of change instruction as the control command based on the input parameter indicative of the queue attribute. Further, the content on the TV (or settings intrinsic to the TV) may be modified in accordance with preset content or values that correspond to the value of the input parameter.

Figure 7:
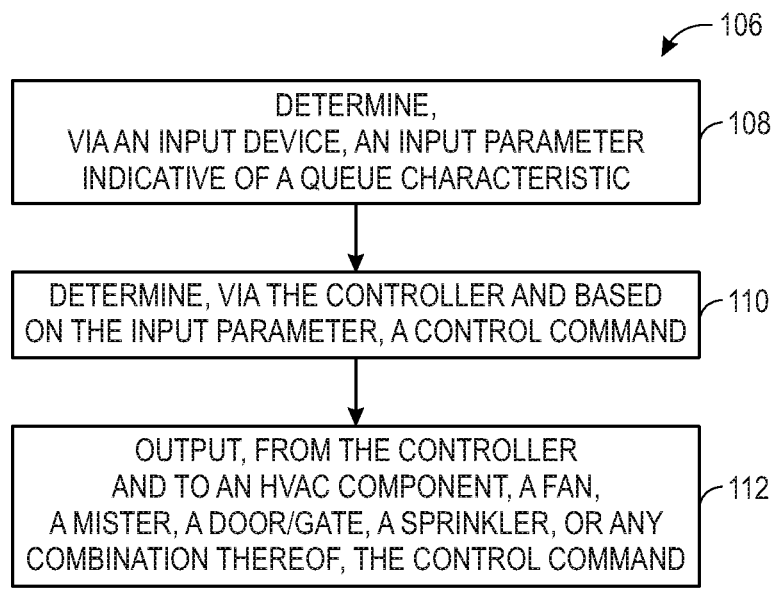
FIG. 7 is a flow chart illustrating a method for controlling facility features of an attraction queue via the queue control system of FIG. 1, in accordance with an embodiment of the present disclosure.

FIG. 7 is a flow chart of a method 106 for controlling one or more components of a facility system (e.g., facilities component) in a queue structure based on an input parameter indicative of a queue characteristic. In particular, the method 106 is an embodiment of controlling one or more of the controllable devices 16 of FIG. 5. The method 106 may be executed at least in part by one or more components of the queue control system 10.

The method 106 includes determining (block 108), via an input device, an input parameter indicative of a queue characteristic. As discussed earlier, a queue characteristic may include a queue length, a queue wait time, a queue flow rate (e.g., throughput), or combinations thereof (e.g., predictive results). The input device may include a sensor or a manual interface, as described above with reference to earlier figures.

The method 106 also includes determining (block 110), via a controller and based on the input parameter, a control command. The control command may be determined from a comparison of the input parameter indicative of the queue characteristic to a stored mapping of desired operating conditions of the components of the facility system to specific queue characteristics. Indeed, the controller may have a memory that includes one or more tables or lists of desired operating conditions of components of the facility system corresponding to one or more specific queue characteristics.

The method 106 may also include outputting (block 112), via the controller and in response to determining that one or more components of the facility system are not operating in accordance with desired operating conditions based on the input parameter, a control command to an HVAC component, a fan, a mister, a door/gate, a sprinkler, another facility component, or any combination thereof. For example, upon receiving an input parameter indicative of a queue length exceeding a capacity for a room (e.g., a queue structure) for guests to wait, a door/gate leading to an overflow room may be opened to accommodate the queue length (or other queue characteristics indicated by the input parameter).

In some embodiments, the controller may activate or deactivate one or more controllable devices based on a predetermined schedule. For example, it may be indicated to the controller via manual input that at a specific time of day (or a specific range of time in a day) a queue length is typically long for the duration of the specific time range. Upon this indication, the controller may be configured to activate or deactivate one or more controllable devices based on the predetermined schedule of average queue lengths at a particular time of day. This may be done to supplement control based specifically on queue characteristics.

In general, presently disclosed systems and techniques enhance a guest experience as a guest waits in a queue to participate in an attraction. The guest experience may be positively influenced by controlling queue features based on an input parameter indicative of a queue characteristic (e.g., a queue length, a queue rate, a queue throughput). The queue characteristic may be identified to exclude non-queue characteristics (e.g., a single individual passing through a location).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A queue control system configured to control a queue structure of a queue, the queue control system comprising:
    a controller configured to:
        receive, from an input device that monitors a queue characteristic of the queue, data feedback indicative of the queue characteristic, wherein the queue characteristic is indicative of a queue wait time corresponding to at least one person in the queue;
        determine a control command based on the data feedback of the queue characteristic indicative of the queue wait time corresponding to the at least one person in the queue; and
        output the control command; and
    a queue structure control comprising an actuator configured to operate an effect associated with the queue structure, wherein:
        the queue structure control is configured to receive the control command; and
        the actuator of the queue structure control is configured to change at least one aspect of the queue structure based on the control command such that the effect is presented only once by the queue structure control during a duration of time corresponding to the queue wait time.

2. The queue control system of claim 1, wherein the actuator of the queue structure control is configured to change the at least one aspect of the queue structure based on the control command such that the effect is presented only once by the queue structure control during the duration of time corresponding to the queue wait time by changing a characteristic of a light, and wherein the control command comprises an instructed value of the characteristic of the light.

3. The queue control system of claim 2, wherein the instructed value of the characteristic of the light is indicative of an intensity of the light.

4. The queue control system of claim 1, wherein the queue structure control comprises a plurality of actuators including the actuator, wherein the plurality of actuators of the queue structure control is configured to change the at least one aspect of the queue structure based on the control command such that the effect is presented only once by the queue structure control during the duration of time corresponding to the queue wait time by changing a plurality of characteristics of a plurality of lights corresponding to the plurality of actuators, and wherein the control command comprises a plurality of instructed values of the plurality of characteristics of the plurality of lights.

5. The queue control system of claim 4, wherein the plurality of instructed values comprises, for each light of the plurality of lights, an activation instruction, a deactivation instruction, and a time period between activation corresponding to the activation instruction and deactivation corresponding to the deactivation instruction.

6. The queue control system of claim 5, wherein the activation instruction, the deactivation instruction, and the time period between the activation corresponding to the activation instruction and the deactivation corresponding to the deactivation instruction are unique for each light of the plurality of lights.

7. The queue control system of claim 4, wherein the plurality of lights comprises a first light and a second light, and wherein the plurality of instructed values comprises:
    a first activation instruction corresponding to activation of the first light at a first moment in time and a first deactivation instruction corresponding to deactivation of the first light at a second moment in time following the first moment in time; and
    a second activation instruction corresponding to activation of the second light at a third moment in time and a second deactivation instruction corresponding to deactivation of the second light at a fourth moment in time after the third moment in time.

8. The queue control system of claim 7, wherein the third moment in time is after the first moment in time.

9. The queue control system of claim 1, comprising a plurality of lights configured to be driven by the queue structure control to provide a wave-like lighting effect.

10. The queue control system of claim 1, wherein the actuator is configured to change the at least one aspect of the queue structure based on the control command such that the effect is presented only once during the duration of time corresponding to the queue wait time by changing a color of a light associated with the queue structure.

11. The queue control system of claim 1, wherein the actuator of the queue structure control is configured to change the at least one aspect of the queue structure based on the control command such that the effect is presented only once during the duration of time corresponding to the queue wait time by moving a facilities component disposed upstream of an entry point to a destination adjacent an end of the queue structure, wherein the facilities component comprises a wall, gate, or door configured to block access to a queue space when the wall, gate, or door is in a closed position and enable access to the queue space when the wall, gate, or door is in an open position.

12. The queue control system of claim 1, wherein the queue structure control comprises a mister, and the actuator of the queue structure control is configured to change the at least one aspect of the queue structure based on the control command such that the effect is presented only once during the duration of time corresponding to the queue wait time by activating or deactivating the mister.

13. The queue control system of claim 1, comprising the input device, wherein the input device comprises a sensor or camera.

14. One or more non-transitory computer-readable media storing instructions which, when executed by at least one processor, cause the at least one processor to perform operations comprising:
receiving, from an input device that monitors a queue characteristic of a queue in a queue structure, data feedback indicative of the queue characteristic, wherein the queue characteristic is indicative of a queue wait time of at least one member in the queue;
determining if the data feedback corresponds to a current operation of an aspect of the queue structure;
in response to determining that the data feedback does not correspond to the current operation of the aspect of the queue structure, determining a control command based on the data feedback, wherein the control command corresponds to a target frequency at which to cause an effect associated with the queue structure, such that the effect, when controlled at the target frequency, is presented only once during a duration of time corresponding to the queue wait time; and
outputting, to one or more actuators of a queue structure control, the control command, wherein the control command, when executed by the one or more actuators of the queue structure control, causes the one or more actuators to change the aspect of the queue structure to correspond to the data feedback by causing the effect to be presented only once during the duration of time corresponding to the queue wait time.

15. The one or more non-transitory computer-readable media of claim 14, wherein the effect corresponds to a first segment of an instructional video presented on a television, such that the instructions when executed by the at least one processor, cause the at least one processor to perform operations comprising:
outputting, to the one or more actuators of the queue structure control, the control command, wherein the control command, when executed by the one or more actuators of the queue structure control, causes the one or more actuators to change the aspect of the queue structure to correspond to the data feedback by actuating the television to display the first segment of the instructional video only once during the duration of time corresponding to the queue wait time.

16. The one or more non-transitory computer-readable media of claim 15, storing instructions which, when executed by the at least one processor, cause the at least one processor to perform operations comprising:
outputting, to the one or more actuators of the queue structure control, an additional control command, wherein the additional control command, when executed by the one or more actuators of the queue structure control, causes the one or more actuators to actuate the television to display a second segment of the instructional video one or more times during the duration of time corresponding to the queue wait time, wherein the second segment of the instructional video corresponds to a safety segment of the instructional video.

17. A queue control system, comprising:
a plurality of lights configured to be disposed in a queue structure defining a queue space of a queue, wherein the plurality of lights is configured to provide a wave-like lighting effect in the queue space;
an input device configured to monitor a queue characteristic of the queue, wherein the queue characteristic comprises a queue length, a queue wait time, a queue rate, or a queue throughput; and
a controller configured to:
receive, from the input device, data feedback indicative of the queue characteristic of the queue during an operating period;
determine, based on the data feedback indicative of the queue characteristic, a target speed of the wave-like lighting effect provided by the plurality of lights;
control one or more actuators associated with the plurality of lights such that the plurality of lights provides the wave-like lighting effect at the target speed during the operating period;
receive, from the input device, additional data feedback indicative of the queue characteristic of the queue during an additional operating period different than the operating period;
determine, based on the additional data feedback indicative of the queue characteristic of the queue during the additional operating period, an additional target speed of the wave-like lighting effect provided by the plurality of lights, the additional target speed differing from the target speed; and
control the one or more actuators associated with the plurality of lights such that the plurality of lights provides the wave-like lighting effect at the additional target speed during the additional operating period.

* * * * *